Dec. 30, 1924.　　　　　　　　　　　　　　　　1,520,869
G. B. KILLAM
SHUTTER FOR AUTOMOBILE HEADLIGHTS AND THE LIKE
Filed June 15, 1923
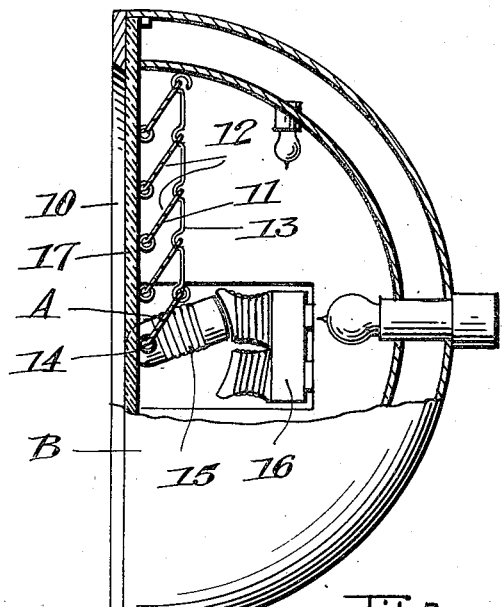
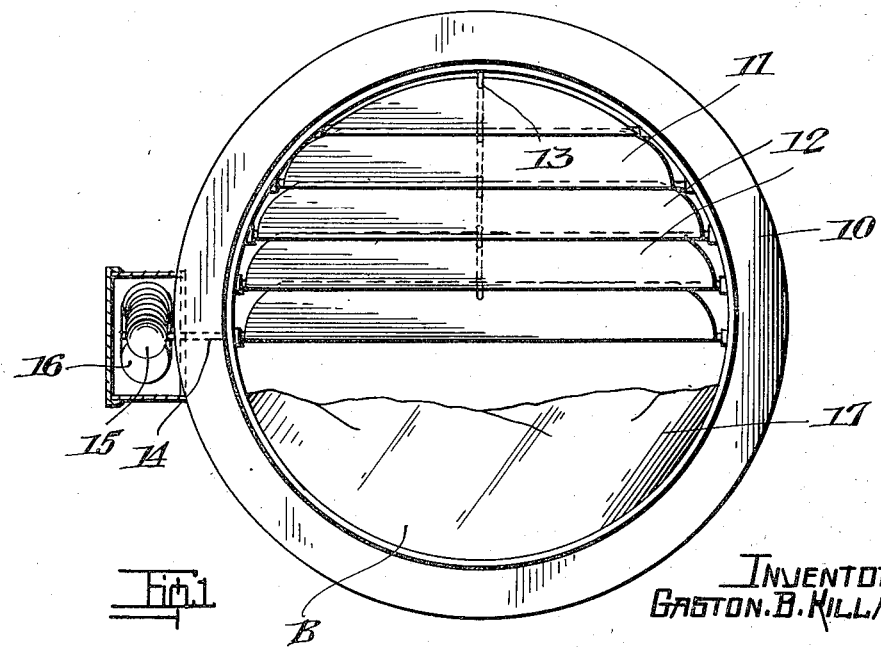
INVENTOR
GASTON. B. KILLAM.

Patented Dec. 30, 1924.

1,520,869

UNITED STATES PATENT OFFICE.

GASTON BROWN KILLAM, OF CALGARY, ALBERTA, CANADA.

SHUTTER FOR AUTOMOBILE HEADLIGHTS AND THE LIKE.

Application filed June 15, 1923. Serial No. 645,606.

*To all whom it may concern:*

Be it known that I, GASTON BROWN KILLAM, a citizen of the United States of America, and a resident of the city of Calgary, in the Province of Alberta and Dominion of Canada, have invented certain new and useful Improvements in Shutters for Automobile Headlights and the like, of which the following is a specification.

This invention relates to improvements in shutters for automobile headlights and the like, and the objects of the invention are to provide means to prevent the glare of headlights whereby, on passing another vehicle, the lights can be partially dimmed by pressing a switch and immediately after passing the vehicle turned on again.

Further objects are to provide a simply constructed and practical means of this character that can be fitted to any ordinary vehicle and which will be operated without any trouble by the driver from the switchboard.

With these and other objects in view, the invention consists essentially in the novel construction and arrangement of parts as described in the present specification and illustrated by the accompanying drawings that form part of the same.

Referring now to the drawings, in which like characters of reference indicate corresponding parts in each figure, and in which:

Figure 1 is a front elevation of a headlight fitted with my device.

Figure 2 is a side elevation partly in section.

In the drawings:

A represents the device as a whole comprising an automobile headlight B provided with a suitable frame 10 in which is mounted a shutter 11 comprising a plurality of pivotally operable slats 12. This shutter as a whole is adapted to extend substantially midway in cross section of the headlight. 13 is the connecting rod for the slats 12 which is connected by a suitable shaft 14 to the electric operating means 15 comprising an electric pull 16 and adapted to be operated by two switches on the dash. 17 is the lens of the headlight, at the back of which, as above described, is arranged the shutter.

In operation, it will be seen that, on one switch being operated, the electric pull 16 will be operated to in turn operate the shaft 14, and through it and the slat connecting rod, the shutter, to close the slats; while on the other switch being operated from the dashboard through the same connections, the slats will be opened.

It should also be noted that at no time in the operation of opening and closing the slats, will the latter be completely closed, so that in the semi-closed or almost closed position, a certain amount of light will be permitted to radiate upwardly but not sufficient to cause inconvenience by glare.

As many changes could be made in the above construction and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A shutter for automobile headlights, comprising a plurality of metal rods pivotally mounted in the headlight, the lowermost being extended outside the casing, a plurality of shutters fixedly secured on said rods, a vertically arranged rod having waves therein, each adapted to connect with a shutter, a compartment on the side of the headlight, receiving the extension of the lower rod, a contact member fixedly secured on said extension, a double acting electric magnet in the compartment adapted to coincide with the contact member, whereby on the operation of the driver, the shutter may be raised or lowered.

In witness whereof I have hereunto set my hand in the presence of two witnesses.

GASTON BROWN KILLAM.

Witnesses:
HENRY L. FITTS.
MURIEL JONES.